United States Patent
Lin et al.

(10) Patent No.: US 10,971,721 B2
(45) Date of Patent: Apr. 6, 2021

(54) LITHIUM BATTERY ANODE MATERIAL AND METHOD OF MANUFACTURING THE SAME

(71) Applicant: AUO Crystal Corporation, Taichung (TW)

(72) Inventors: Han-Tu Lin, Hsinchu County (TW); Han-Chang Huang, Taoyuan (TW); An-Li He, Changhua County (TW); Yi-Yen Tsou, Nantou County (TW); Meng-Kwei Hsu, Taichung (TW)

(73) Assignee: AUO Crystal Corporation, Taichung (TW)

( * ) Notice: Subject to any disclaimer, the term of this patent is extended or adjusted under 35 U.S.C. 154(b) by 196 days.

(21) Appl. No.: 16/417,651

(22) Filed: May 21, 2019

(65) Prior Publication Data

US 2019/0355977 A1    Nov. 21, 2019

(30) Foreign Application Priority Data

May 21, 2018 (TW) .................. 107117217

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0471* (2013.01); *H01M 4/133* (2013.01);
(Continued)

(58) Field of Classification Search
CPC .... H01M 4/0471; H01M 4/133; H01M 4/134; H01M 4/364; H01M 4/386
(Continued)

(56) References Cited

U.S. PATENT DOCUMENTS

| 8,999,581 B2 | 4/2015 | Lee et al. |
| 9,882,209 B2 | 1/2018 | Lee et al. |

(Continued)

FOREIGN PATENT DOCUMENTS

| JP | 2009535776 | 10/2009 |
| JP | 2017120787 | 7/2017 |

(Continued)

OTHER PUBLICATIONS

"Office Action of Japan Counterpart Application", dated Aug. 18, 2020, p. 1-p. 4.
(Continued)

*Primary Examiner* — James M Erwin
(74) *Attorney, Agent, or Firm* — JCIPRNET

(57) ABSTRACT

Provided is a lithium battery anode material including a graphite material and a composite material. The composite material and the graphite material are crossly mixed together to form a plurality of spherical structures. The composite material includes a silicon material, an agglomerate, and a plurality of protrusions. A plurality of crystals are grown on a surface of the silicon material. The crystals include silicon carbide. The agglomerate includes metal silicide. The protrusions are distributed on a surface of the agglomerate. The protrusions include silicon and metal.

20 Claims, 13 Drawing Sheets

(51) Int. Cl.
    *H01M 4/133* (2010.01)
    *H01M 4/134* (2010.01)
    *H01M 4/583* (2010.01)
    *H01M 10/052* (2010.01)
    *H01M 4/38* (2006.01)
    *H01M 4/02* (2006.01)

(52) U.S. Cl.
    CPC ........... *H01M 4/134* (2013.01); *H01M 4/386* (2013.01); *H01M 4/583* (2013.01); *H01M 10/052* (2013.01); *H01M 2004/021* (2013.01); *H01M 2004/027* (2013.01)

(58) Field of Classification Search
    USPC ....................................................... 429/218.1
    See application file for complete search history.

(56) References Cited

U.S. PATENT DOCUMENTS

| | | | |
|---|---|---|---|
| 10,038,191 | B2 | 7/2018 | Yuge |
| 10,403,888 | B2 | 9/2019 | Lin et al. |
| 10,682,633 | B2 | 6/2020 | Pham-Huu et al. |
| 2009/0053608 | A1 | 2/2009 | Choi et al. |
| 2010/0273058 | A1 | 10/2010 | Lee et al. |
| 2015/0180019 | A1 | 6/2015 | Lee et al. |
| 2016/0181613 | A1 | 6/2016 | Yuge |
| 2016/0190596 | A1* | 6/2016 | Mah ............. H01M 4/58 429/218.1 |
| 2017/0194641 | A1 | 7/2017 | Lin et al. |
| 2017/0346085 | A1* | 11/2017 | Suh ............. H01M 4/625 |
| 2018/0008968 | A1 | 1/2018 | Pham-Huu et al. |

FOREIGN PATENT DOCUMENTS

| | | |
|---|---|---|
| KR | 20090001316 | 1/2009 |
| KR | 101725381 | 4/2017 |
| KR | 20170080530 | 7/2017 |
| TW | 201724630 | 7/2017 |
| WO | 2015025722 | 2/2015 |
| WO | 2016116542 | 7/2016 |

OTHER PUBLICATIONS

"Office Action of Korea Counterpart Application", dated Nov. 29, 2020, with English translation thereof, p. 1-p. 17.

\* cited by examiner

Example 6

Example 7 under US 10,971,721 B2

LITHIUM BATTERY ANODE MATERIAL AND METHOD OF MANUFACTURING THE SAME

CROSS REFERENCE TO RELATED APPLICATION

This application claims the priority benefit of Taiwan Patent Application No. 107117217, filed on May 21, 2018. The entirety of the above-mentioned patent application is hereby incorporated by reference herein and made a part of this specification.

BACKGROUND OF THE INVENTION

Field of the Invention

The invention relates to an anode material (or a negative electrode material) and a method of manufacturing the same, and more particularly, to a lithium battery anode material and a method of manufacturing the same.

Description of Related Art

During adsorbing and desorbing lithium ions from the silicon-based anode material, the anode material undergoes intense volume expansion and contraction that causes the decomposition of the anode material and greatly reducing the cycle life of the battery. On the other hand, the use of pure silicon material as the anode material is also limited by its poor conductivity. In addition, although it has been proposed to further form carbon fibers on the surface of the silicon material to solve the problems of the cycle life and the conductivity. However, such method has to perform a complex process of a gas phase reaction (e.g., chemical vapor deposition) to grow the carbon fibers. Therefore, how to develop a novel anode material, so that the lithium battery has high cycle life, high capacitance, high-speed charging/discharging, and relatively simple processes is one of the goals that technicians in the field are currently aiming to achieve.

SUMMARY OF THE INVENTION

The invention provides a lithium battery anode material having a silicon-based material and a method of manufacturing the same.

The invention provides a lithium battery anode material including a graphite material and a composite material. The composite material and the graphite material are mixed to form a plurality of spherical structures. The composite material includes a silicon material, an agglomerate, and a plurality of protrusions. A plurality of crystals are grown on a surface of the silicon material. The crystals include silicon carbide. The agglomerate includes metal silicide. The protrusions are distributed on a surface of the agglomerate. The protrusions include silicon and metal.

The invention provides a method of manufacturing a lithium battery anode material including following steps. A silicon material, a metal source, a graphite material, and a carbon source are mixed uniformly to form a mixed slurry. A granulation process is performed on the mixed slurry to form a plurality of spherical structures. A heat treatment is performed on the spherical structures to form the lithium battery anode material.

Based on the above, in the present invention, a composite material having a silicon-based material and a graphite material are mixed to form a lithium battery anode material having a plurality of spherical structures. The silicon-based material is able to effectively increase the capacitance of the lithium battery. The silicon carbide in the composite material may buffer the volume expansion of the silicon-based material, thereby solving the problem of decomposition of the anode material due to excessive expansion of the silicon-based material, and further increasing the charge/discharge retention rate and extending the life time of the lithium battery. In addition, the lithium battery anode material of the present invention further includes a soft carbon to achieve a high-speed charge/discharge effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
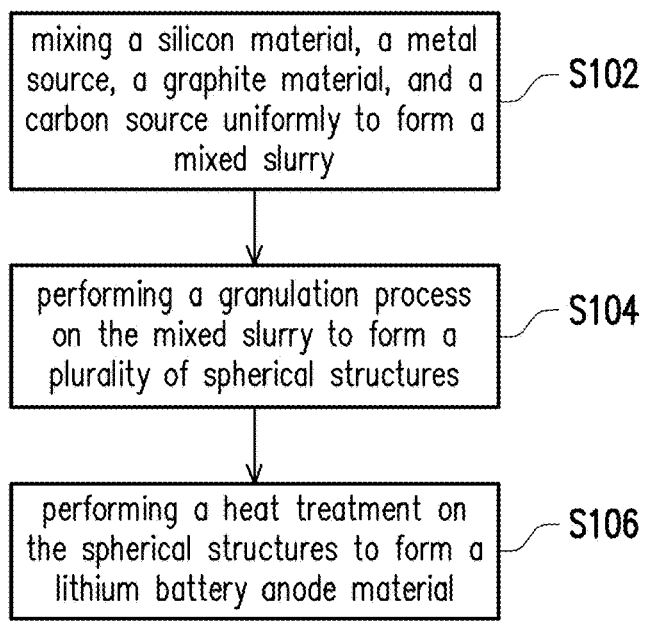
FIG. 1 is a schematic view showing the manufacturing process of a lithium battery anode material in accordance with a first embodiment of the present invention.

The invention is more comprehensively described with reference to the figures of the present embodiments. However, the invention may also be implemented in various different forms, and is not limited to the embodiments in the present specification. The thicknesses of the layers and regions in the figures are enlarged for clarity. The same or similar reference numerals represent the same or similar devices and are not repeated in the following paragraphs.

FIG. 1 is a schematic view showing the manufacturing process of a lithium battery anode material in accordance with a first embodiment of the present invention.

Referring to FIG. 1, a first embodiment of the present invention provides a method of manufacturing a lithium battery anode material including following steps. First, in step S102, a silicon material, a metal source, a graphite material, and a carbon source are uniformly mixed to form a mixed slurry.

In this embodiment, the silicon material may be a sheet-like silicon that is derived from a residue after cutting a silicon wafer or a silicon ingot. However, the invention is not limited thereto, in other embodiments, the silicon material also includes a form of particles, a form of powders, or a combination thereof. In one embodiment, a thickness of the sheet-like silicon may be from 50 nm to 200 nm and a length and a width of the sheet-like silicon may be less than 5 micrometers ($\mu m$). In another embodiment, an average particle diameter of the silicon material may be from 100 nm to 900 nm. In other embodiments, a content of the silicon material may be from 3 wt % to 80 wt %, based on the weight of the mixed slurry.

In an embodiment, the metal source comprises a metal salt solution. The metal salt solution includes metal atoms that include one of nickel (Ni), titanium (Ti), iron (Fe), cobalt (Co); and salts that include one of sulfate, acetate, nitrate, citrate, oxalate or other organic acid radicals. For example, the metal source may be nickel acetate, nickel sulfate, nickel nitrate, nickel citrate, nickel oxalate, nickel chloride, or a combination thereof. However, the invention is not limited thereto, and in other embodiments, it is within the scope of the invention that the metal atom is able to catalyze the silicon material and the carbon source to form silicon carbide, and the metal atom may be but not limited to copper. In an embodiment, a content of the metal source may be from 3 wt % to 30 wt %, based on the weight of the mixed slurry.

In an embodiment, the graphite material includes a few-layer graphite. In particular, the method of forming the few-layer graphite includes passing a graphite bulk through a high pressure passage, so that the graphite bulk is rubbed to peel off the few-layer graphite. In this embodiment, the high pressure passage may be a narrow passage having a width of 100 $\mu m$ or less, and the material thereof may be a diamond. In this embodiment, the number of layers of the few-layer graphite may be from 1 to 30, but the invention is not limited thereto. In an embodiment, the number of layers may be adjusted by controlling the times of passing through the high pressure passage. That is, the more times the graphite bulk passes through the high pressure passage, the less number of layers of the few-layer graphite is, but the number of the few-layer graphite increases. In an embodiment, a content of the graphite material may be from 5 wt % to 30 wt %, based on the weight of the mixed slurry. In other embodiments, the graphite material may be natural graphite, synthetic graphite or mesophase graphite which may have a poor conductivity with different degrees than the few-layer graphite while being used in the anode material. For example, the graphite material may be but not limited to block-like natural graphite.

In an embodiment, the carbon source includes pitch, glucose, citric acid, any organic carbon, or a combination thereof. A content of the carbon source may be from 3 wt % to 20 wt %, based on the weight of the mixed slurry.

Next, in step S104, a granulation process is performed on the mixed slurry to form a plurality of spherical structures. In one embodiment, the granulation process may place the mixed slurry into a granulator, thereby drying and granulating the mixed slurry into the plurality of spherical structures. In an embodiment, the spherical structure may have a $D_{50}$ particle size between 3 $\mu m$ and 25 $\mu m$. Herein, the $D_{50}$ particle size is expressed as a particle size corresponding to a cumulative particle size distribution percentage of a sample reaching 50%. That is to say, particles with a particle size greater than the $D_{50}$ particle size account for 50%, and particles with a particle size less than the $D_{50}$ particle size also account for 50%. Therefore, the $D_{50}$ particle size may also be referred to as a median diameter.

Thereafter, in step S106, a heat treatment is performed on the plurality of spherical structures to form a lithium battery anode material. In one embodiment, the heat treatment includes a first heat treatment and a second heat treatment, the processing temperature of the first heat treatment is less than the processing temperature of the second heat treatment, and the processing time of the first heat treatment is less than or equal to the processing time of the second heat treatment. Specifically, the processing temperature of the first heat treatment is 260° C. to 600° C., and the processing time of the first heat treatment may be 5 minutes to 30 minutes. The first heat treatment promotes the formation of metal silicide to increase the conductivity of the lithium battery anode material. The processing temperature of the second heat treatment may be 800° C. to 1100° C., and the processing time of the second heat treatment may be 30 minutes to 200 minutes. The second heat treatment promotes the formation of silicon carbide which is used as a buffer for relieving the stress generated by the volume expansion of the lithium battery anode material during charging/discharging, thereby improving the stability of the lithium battery anode material.

Figure 2:
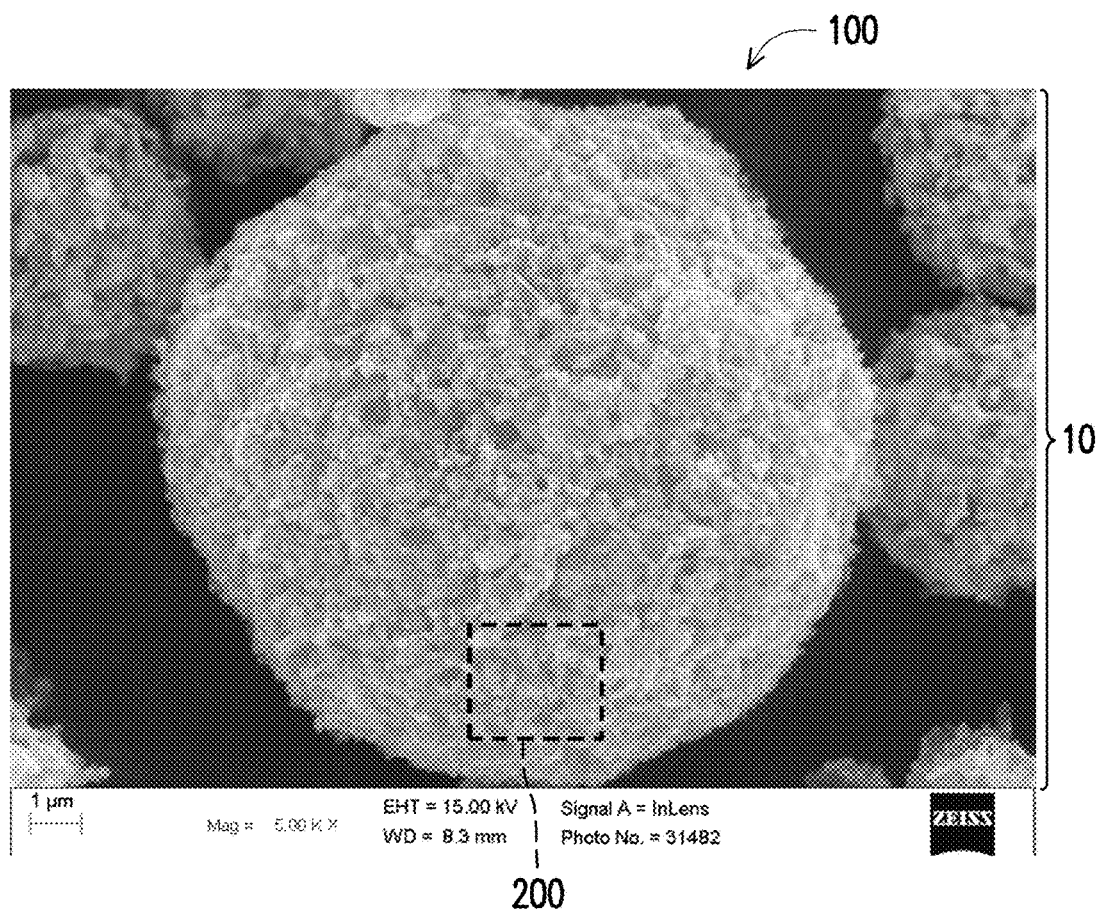
FIG. 2 is an electron micrograph of the lithium battery anode material in accordance with the first embodiment of the present invention.
Figure 3A:
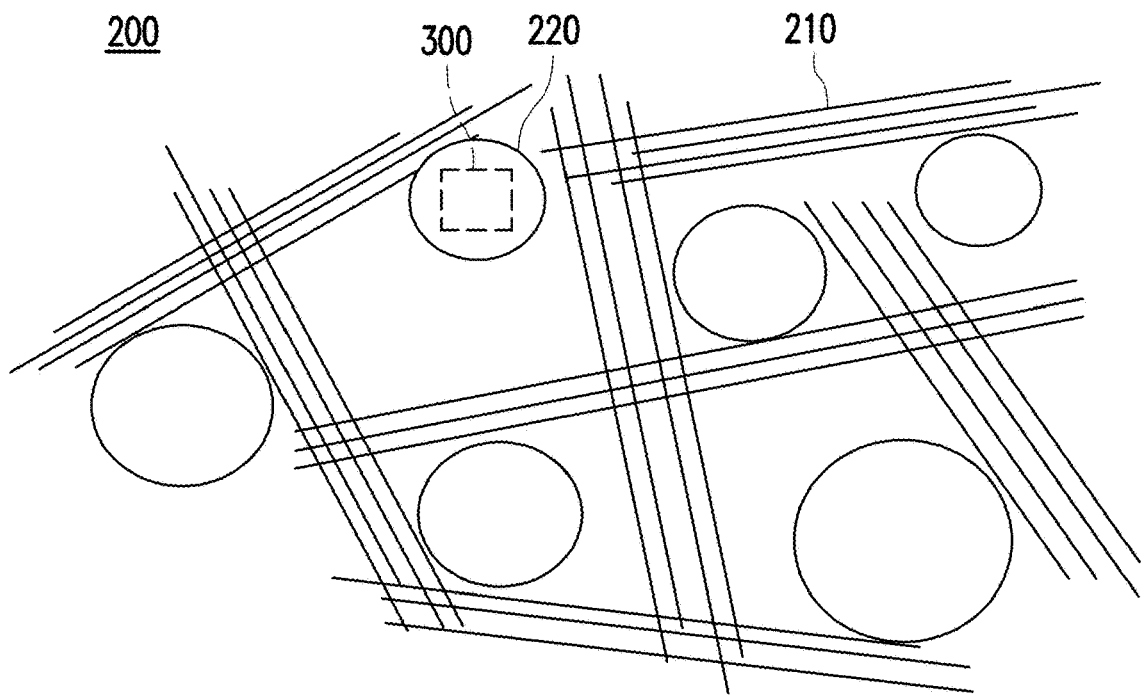
FIG. 3A is an enlarged schematic view of a portion of the lithium battery anode material of FIG. 2.
Figure 3B:
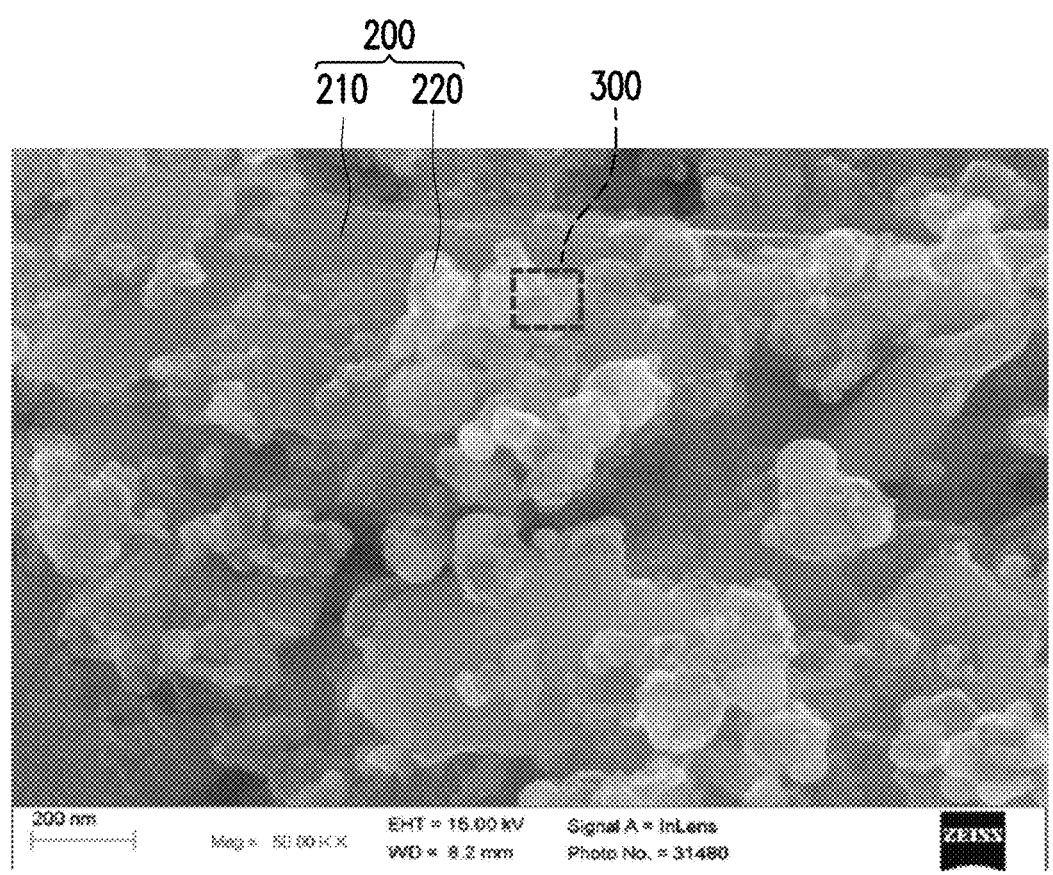
FIG. 3B is a scanning electron microscope (SEM) image of a surface of the portion of the lithium battery anode material of FIG. 2.

FIG. 2 is an electron micrograph of the lithium battery anode material in accordance with the first embodiment of the present invention. FIG. 3A is an enlarged schematic view of a portion 200 of the lithium battery anode material of FIG. 2. FIG. 3B is a scanning electron microscope (SEM) image of a surface of the portion 200 of the lithium battery anode material of FIG. 2.

Referring to FIG. 2, the lithium battery anode material 10 manufactured by the manufacturing process of the lithium battery anode material illustrated in FIG. 1 includes a plurality of spherical structures 100. In an embodiment, the spherical structure may have the $D_{50}$ particle size between 3 $\mu m$ and 25 $\mu m$. In detail, as shown in FIG. 2, each of the spherical structures 100 has a plurality of holes to form a non-smooth surface. Referring to FIGS. 3A and 3B, the portion 200 of the lithium battery anode material 10 includes a graphite material 210 and a composite material 220. As shown in FIGS. 3A and 3B, the graphite material 210 and the composite material 220 are crossly mixed together to form the plurality of spherical structures 100 (as shown in FIG. 2). In this embodiment, the graphite material 210 may be a few-layer graphite. The number of layers of the few-layer graphite may be from 1 to 30. Although the shape of the composite material 220 illustrated in FIG. 3A is circular, the invention is not limited thereto. In other embodiments, as shown in FIG. 3B, the composite material 220 may be an irregular shape.

Figure 4A:
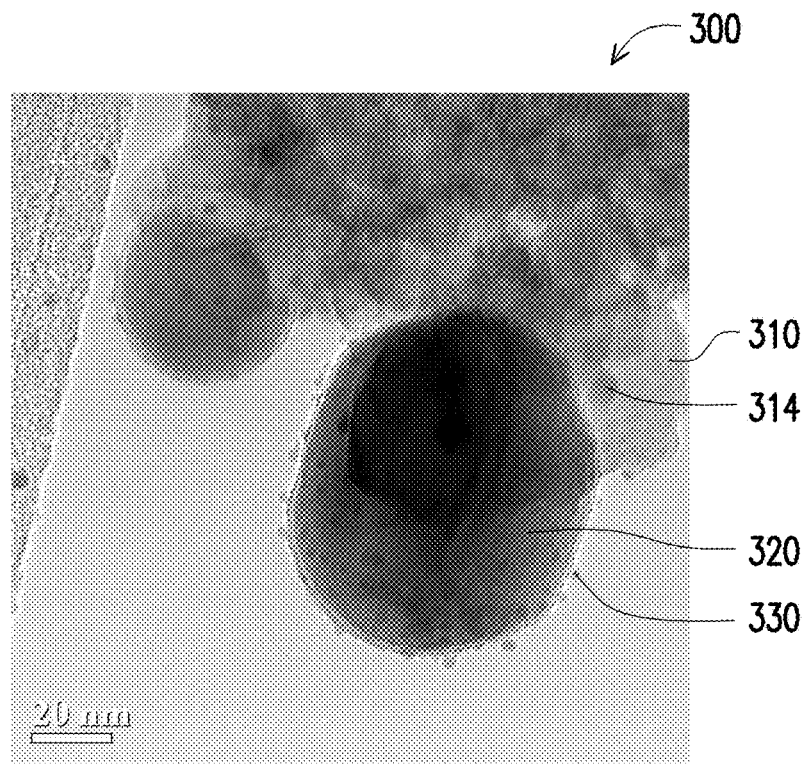
FIGS. 4A and 4B are transmission electron microscope (TEM) images of a portion of the composite material of FIG. 3B, respectively.
Figure 4B:
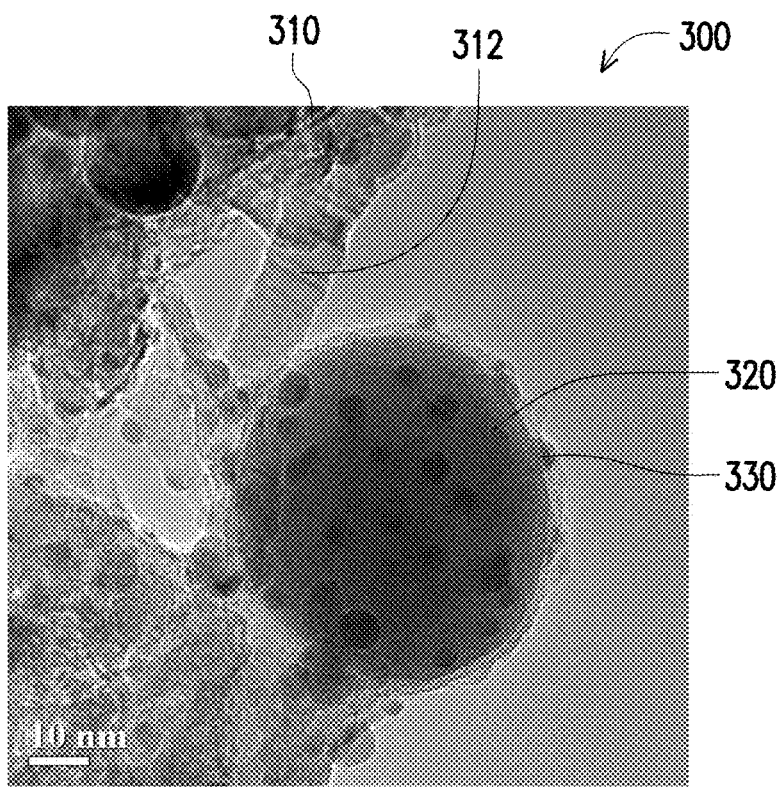

FIGS. 4A and 4B are transmission electron microscope (TEM) images of a portion 300 of the composite material of FIG. 3B, respectively.

Figure 5:
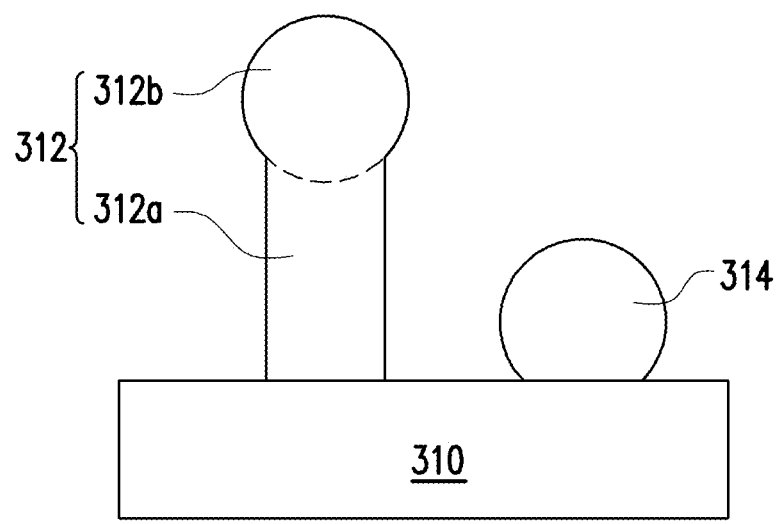
FIG. 5 is a schematic cross-sectional view of crystals.
Figure 6:
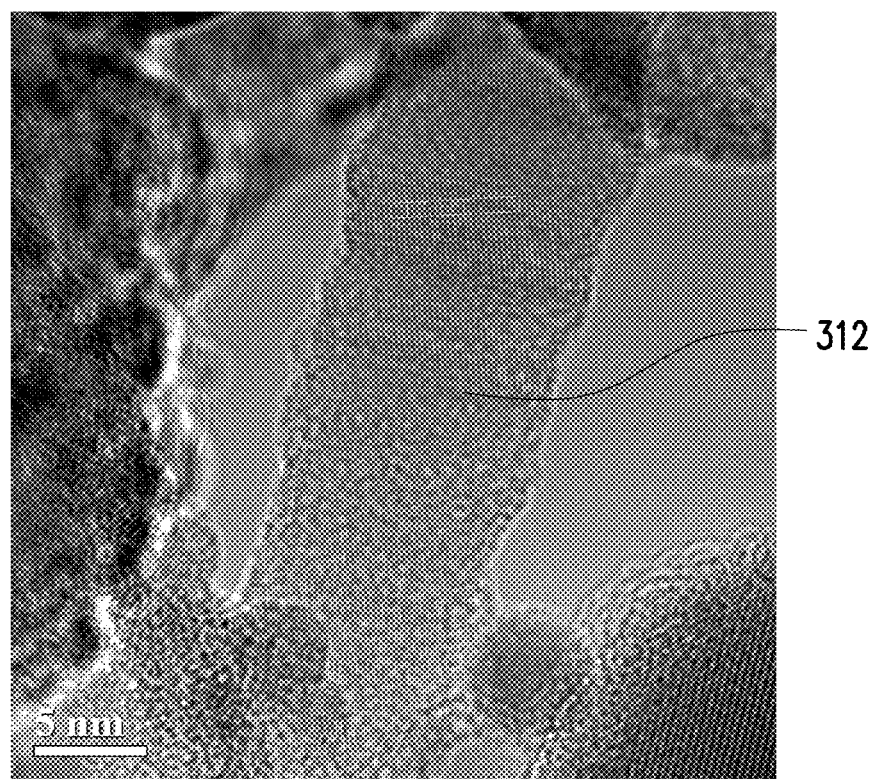
FIG. 6 is a TEM image of the crystals.

Referring to FIGS. 4A and 4B, the portion 300 of the composite material 220 includes a silicon material 310, an agglomerate 320, and a plurality of protrusions 330. Specifically, the silicon material 310 may be a sheet-like silicon, which is able to effectively increase the capacitance of the lithium battery and suppress volume expansion. The surface of the silicon material 310 forms metal silicide, metal oxide, and silicon oxide, and a plurality of crystals 312 and 314 are grown thereon. The crystals 312 and 314 include silicon carbide. In detail, the crystals 312 and 314 having silicon carbide may be grown on the surface of the silicon material 310 by the catalysis of the metal source and the heat treatment illustrated in FIG. 1. The crystals 312 and 314 are distributed on the surface of the silicon material 310. As shown in FIG. 5, the crystal 312 includes a whisker that includes a columnar portion 312a and a spherical portion 312b on the columnar portion 312a. In an embodiment, the columnar portion 312a is in contact with the surface of the silicon material 310, and an included angle between the sidewall of the columnar portion 312a and the surface of the silicon material 310 is approximately a right angle. However, the present invention is not limited thereto, in other embodiments, the included angle between the sidewall of the columnar portion 312a and the surface of the silicon material 310 may be an acute angle or an obtuse angle. The columnar portion 312a illustrated in FIG. 5 corresponds to a TEM image of the crystal 312 having a whisker structure (as shown in FIG. 6). Additionally, another crystal 314 includes a spherical portion that is in contact with the surface of the silicon material 310. In an embodiment, the diameter of the spherical portion of crystals 314 may be greater than the diameter of the spherical portion 312b of the crystal 312.

Referring to FIGS. 4A and 4B, the agglomerate 320 may include metal silicide. In an embodiment, the metal silicide may be nickel silicide (NiSi), titanium silicide (TiSi), iron silicide (FeSi), cobalt silicide (CoSi), or a combination thereof. The metal silicide may be used to increase the conductivity of the lithium battery anode material 10. As shown in FIGS. 4A and 4B, the agglomerate 320 may have a circular or circular-like profile with a diameter between 5 nm and 100 nm. The surface of agglomerate 320 has a plurality of protrusions 330 distributed thereon. In an embodiment, the protrusions 330 may be separated from one another. In alternative embodiments, the precursors 330 may also be connected to one another. The protrusions 330 include silicon, metal, and carbon. In an embodiment, the metal includes nickel (Ni), titanium (Ti), iron (Fe), cobalt (Co), or a combination thereof. For example, the protrusions 330 may be constituted of silicon, nickel, and carbon, which may be present separately or in the form of a compound, such as nickel silicide and silicon carbide. However, the invention is not limited thereto, in other embodiments, the protrusions 330 may be constituted of a silicon element and a nickel element.

Figure 7:
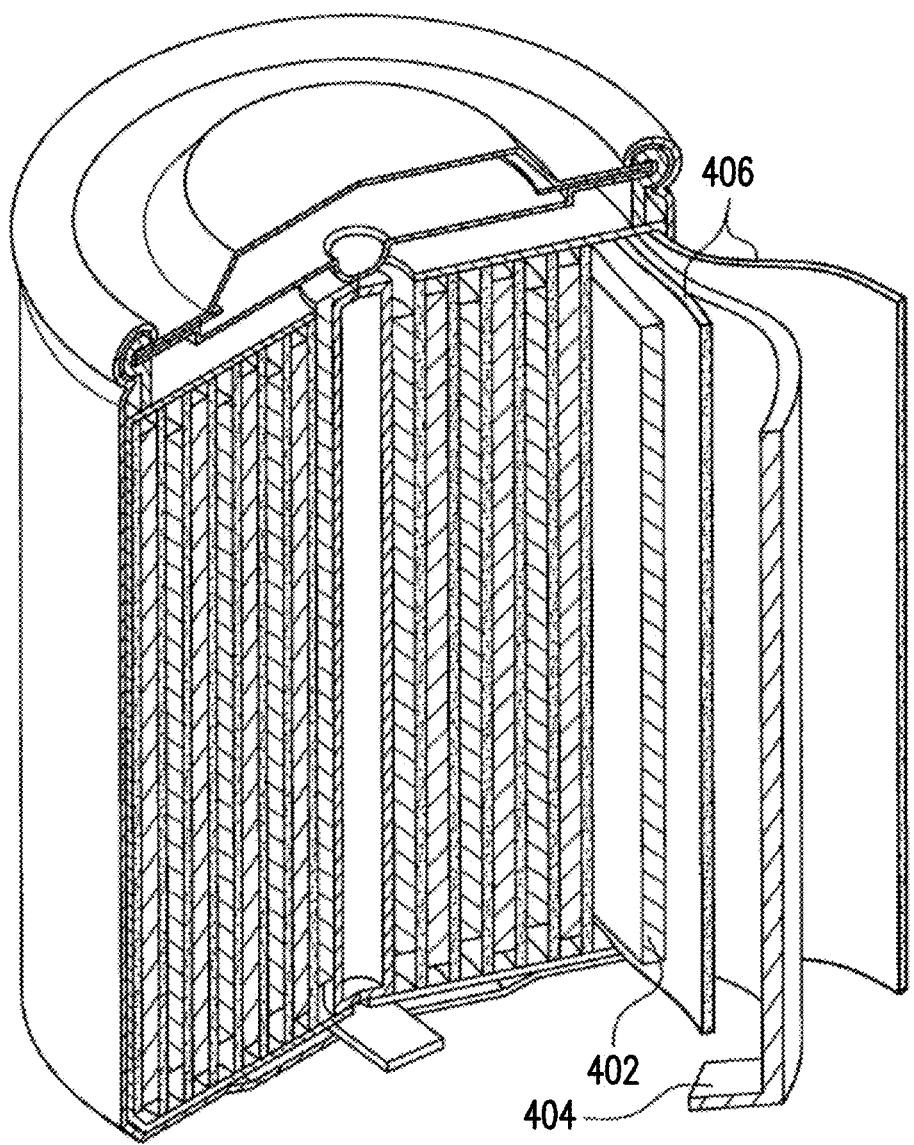
FIG. 7 is a perspective view of an overall structure of a lithium battery according to an embodiment of the invention.

FIG. 7 is a perspective view of an overall structure of a lithium battery according to an embodiment of the invention.

The lithium battery anode material 10 may be applied to a lithium battery. Specifically, as shown in FIG. 7, the lithium battery 400 may be a common cylindrical structure, but the invention is not limited thereto. In other embodiments, the lithium battery 400 can also be a button-shaped structure or other suitable structure. The lithium battery 400 includes a positive electrode 402, a negative electrode 404, and a separator 406. An electrolyte (not shown) is filled between the positive electrode 402 and the negative electrode 404, and the separator 406 is used to prevent the positive electrode 402 from contacting with the negative electrode 404 thereby resulting in a short circuit. The lithium battery anode material 10 of the present embodiment may be disposed on a current collector (not shown) to form the negative electrode 404. When the lithium battery 400 is charged, the positive electrode 402 undergoes an oxidation reaction to release electrons; the negative electrode 404 undergoes a reduction reaction to absorb electrons. That is, the lithium battery anode material 10 in the negative electrode 404 absorbs lithium ions and electrons to carry out a reduction reaction. When the lithium battery anode material 10 absorbs lithium ions, its volume expands correspondingly. In the present embodiment, the composite material 220 is able to reduce the volume expansion ratio of the lithium battery anode material 10, thereby improving the charge/discharge retention rate of the lithium battery and extending the life time of the lithium battery. On the other hand, the reaction opposite to the above is performed when the lithium battery 400 is discharged.

In order to prove the practicality of the invention, the following lists several examples to illustrate the lithium battery anode material of the invention further. Although the following experiments are described, the material used and the amount and ratio of each thereof, as well as handling details and handling procedures, etc., may be suitably modified without exceeding the scope of the invention. Accordingly, restrictive interpretation should not be made to the invention based on the embodiments described below.

Comparative Example 1

Figure 8:
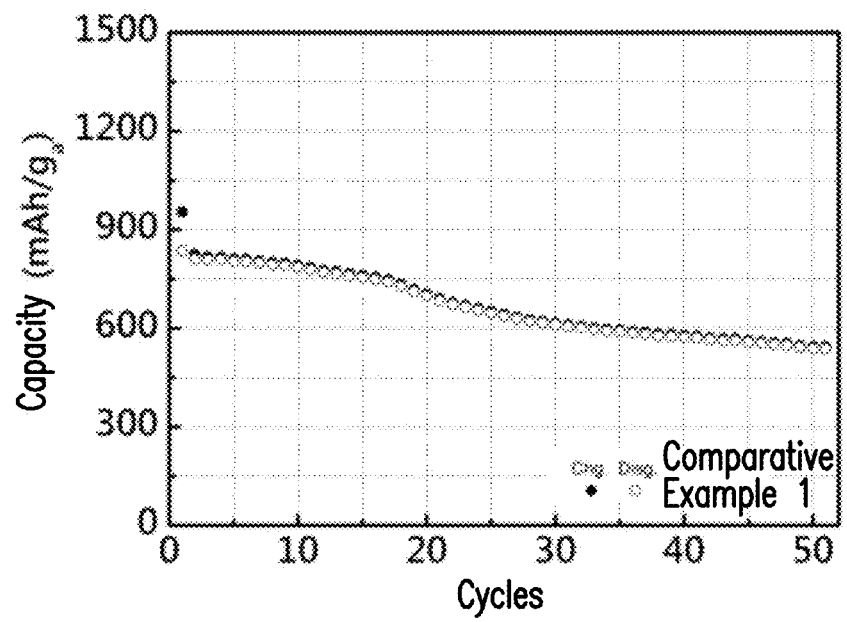
FIG. 8 is a graph showing the cycle charge/discharge efficiency of Comparative Example 1.

In Comparative Example 1, 20 wt % of an anode active material which is not added with metal source (i.e., a composition of the silicon material, the carbon source and the few-layer graphite) and 62.5 wt % of natural graphite (purchased from Long Time Tech. Co., Ltd., model no. GN580L) were provided, and 7.5 wt % superconductive carbon black (super p) and 10 wt % binder (purchased from Scientific Polymer Products, Inc., model no. PAA-Na) were further added to form a lithium battery anode material of Comparative Example 1. Next, the lithium battery anode material of Comparative Example 1 was subjected to cycle charge/discharge, and the result is shown in FIG. 8.

Example 1

Figure 9:
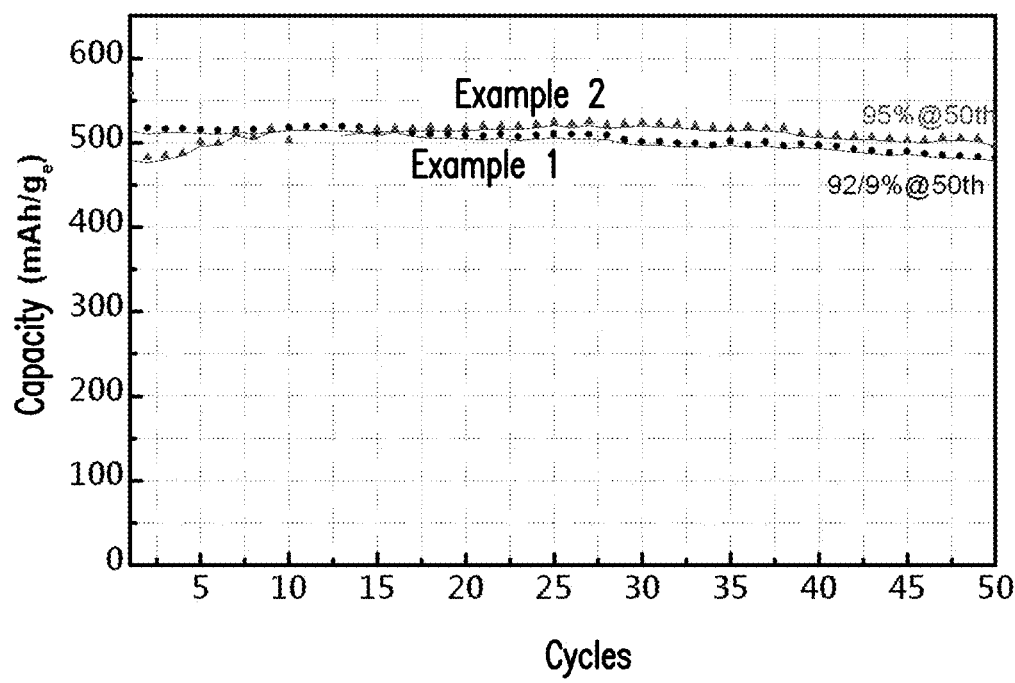
FIG. 9 is a graph showing the cycle charge/discharge efficiency of Example 1 and Example 2.

In Example 1, 19 wt % of an anode active material which is added with metal source (i.e., the lithium battery anode material manufactured by the above-mentioned manufacturing process illustrated in FIG. 1 with a Ni content of 6.3%) and 68 wt % of natural graphite (purchased from Long Time Tech. Co., Ltd., model no. GN580L) were provided, and 5 wt % superconductive carbon black (super p) and 8 wt % binder (purchased from Scientific Polymer Products, Inc., model no. PAA-Na) were further added to form a lithium battery anode material of Example 1. Next, the lithium battery anode material of Example 1 was subjected to cycle charge/discharge, and the result is shown in FIG. 9.

Example 2

In Example 2, 19 wt % of an anode active material which is added with metal source (i.e., the lithium battery anode material manufactured by the above-mentioned manufacturing process illustrated in FIG. 1 with a Ni content of 10%) and 68 wt % of natural graphite (purchased from Long Time Tech. Co., Ltd., model no. GN580L) were provided, and 5 wt % superconductive carbon black (super p) and 8 wt % binder (purchased from Scientific Polymer Products, Inc., model no. PAA-Na) were further added to form a lithium battery anode material of Example 2. Next, the lithium battery anode material of Example 2 was subjected to cycle charge/discharge, and the result is shown in FIG. 9.

FIG. 8 is a graph showing the cycle charge/discharge efficiency of Comparative Example 1. FIG. 9 is a graph showing the cycle charge/discharge efficiency of Example 1 and Example 2.

Referring to FIG. 8, after performing 50 charge/discharge cycles on the anode material of Comparative Example 1, the capacitance value thereof was lowered to 64.4%. Referring to FIG. 9, after performing 50 charging/discharging cycles on the anode material of Example 1 and Example 2, the capacitance value was maintained at 92% to 95%. That is to say, the anode material with only carbon has the poor charge/discharge retention rate than the anode material with metal Ni.

Figure 10A:
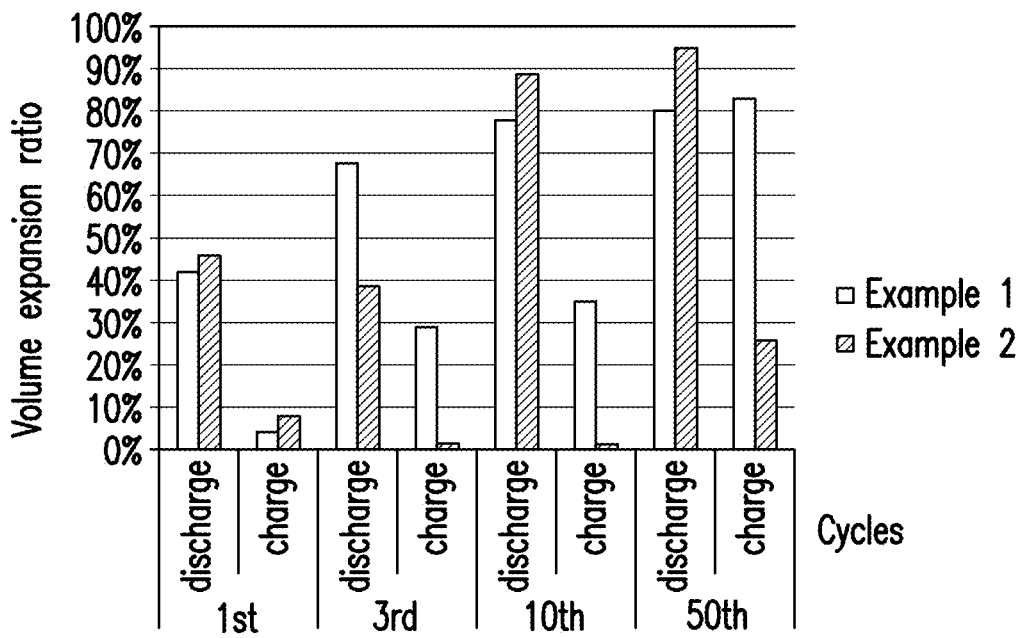
FIG. 10A is a graph showing the relationship between the volume expansion ratio and the number of cycles of Examples 1 and 2.
Figure 10B:
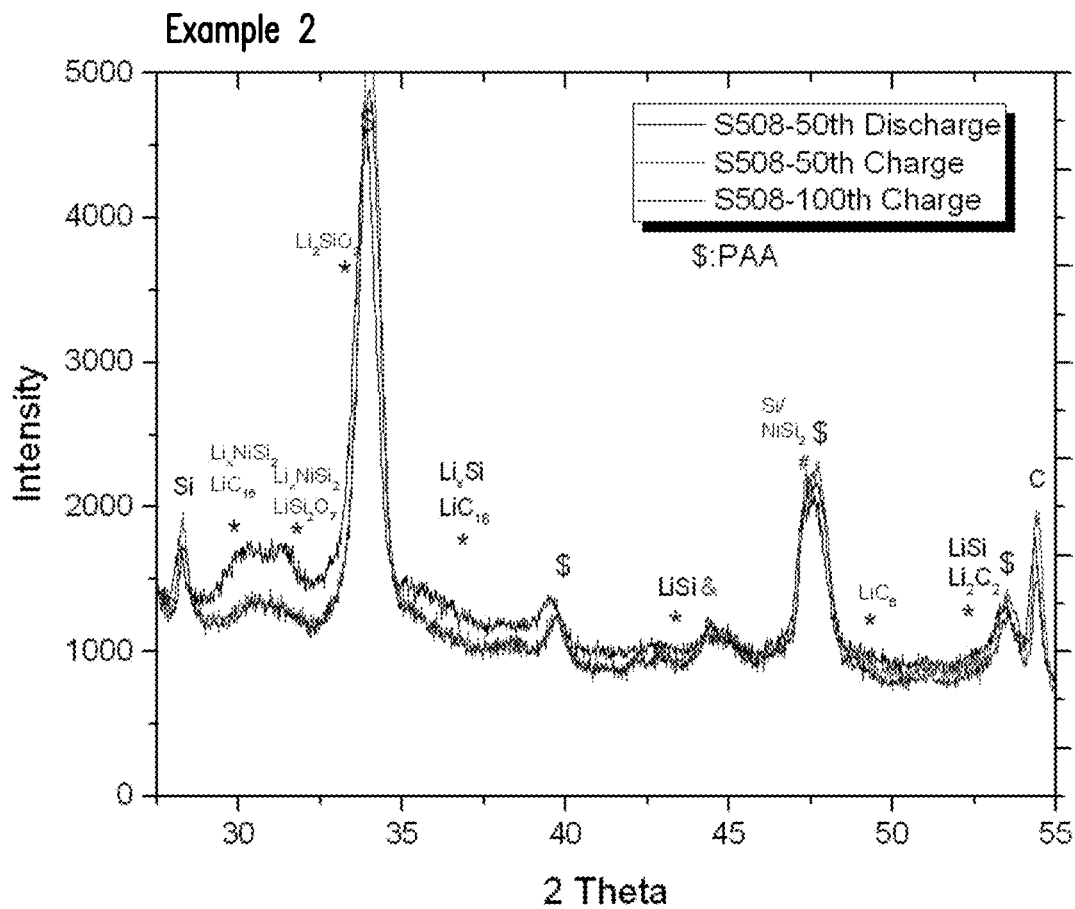
FIG. 10B is an X-ray diffraction (XRD) graph of Example 2 at different charge/discharge cycles.

FIG. 10A is a graph showing the relationship between the volume expansion ratio and the number of cycles of Examples 1 and 2. FIG. 10B is an X-ray diffraction (XRD) graph of Example 2 at different charge/discharge cycles.

Referring to FIG. 10A, the anode material of Example 2 has better volume recovery rate than the anode material of Example 1 after 50 charging/discharging cycles. As shown in FIG. 10B, it was found that the charge-discharge behavior of both anode materials of Example 1 and Example 2 have high reversibility illustrated in XRD of FIG. 10B, and remained after up to 100 charge/discharge cycles. This phenomenon is mainly due to the contribution of the nickel alloy phase.

Figure 11:
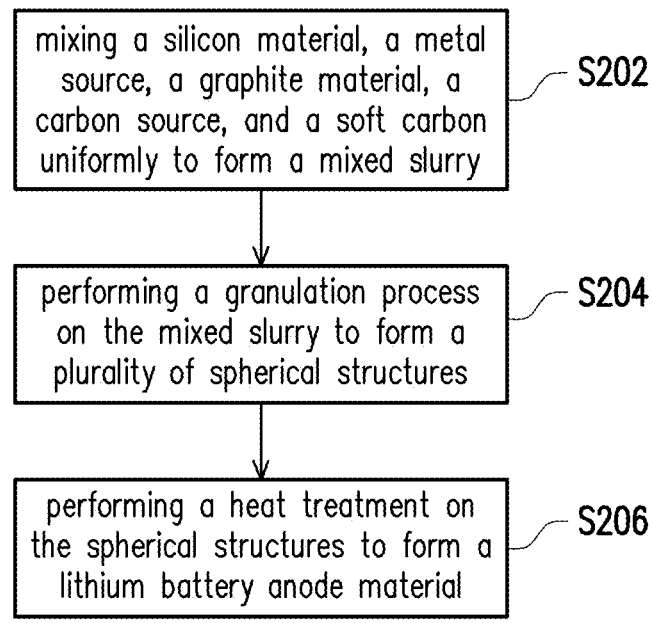
FIG. 11 is a schematic view showing the manufacturing process of a lithium battery anode material in accordance with a second embodiment of the present invention.

FIG. 11 is a schematic view showing the manufacturing process of a lithium battery anode material in accordance with a second embodiment of the present invention.

Referring to FIG. 11, a second embodiment of the present invention provides a method of manufacturing a lithium battery anode material including following steps. First, in step S202, a silicon material, a metal source, a graphite material, a carbon source, and a soft carbon are uniformly mixed to form a mixed slurry. In an embodiment, a content of the soft carbon may be from 20 wt % to 60 wt %, based on the weight of the mixed slurry. Basically, step S202 is similar to step S102 except that soft carbon is added, and details are not described herein again.

Next, in step S204, a granulation process is performed on the mixed slurry to form a plurality of spherical structures. The soft carbon is uniformly distributed in the plurality of spherical structures. Basically, the granulation process of step S204 is similar to the granulation process of step S104, and will not be described herein.

Thereafter, in step S206, a heat treatment is performed on the plurality of spherical structures to form a lithium battery anode material. Basically, step S206 is similar to step S106, and will not be described again here.

Example 3

Figure 12:
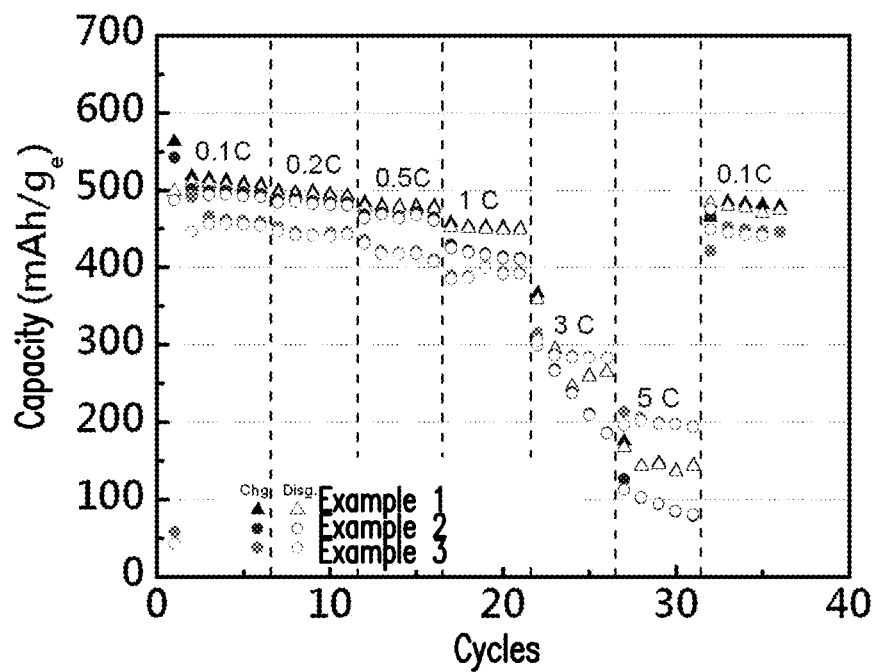
FIG. 12 is a graph showing the cycle charge/discharge efficiency of Examples 1-3 at different charge rates.
Figure 13:
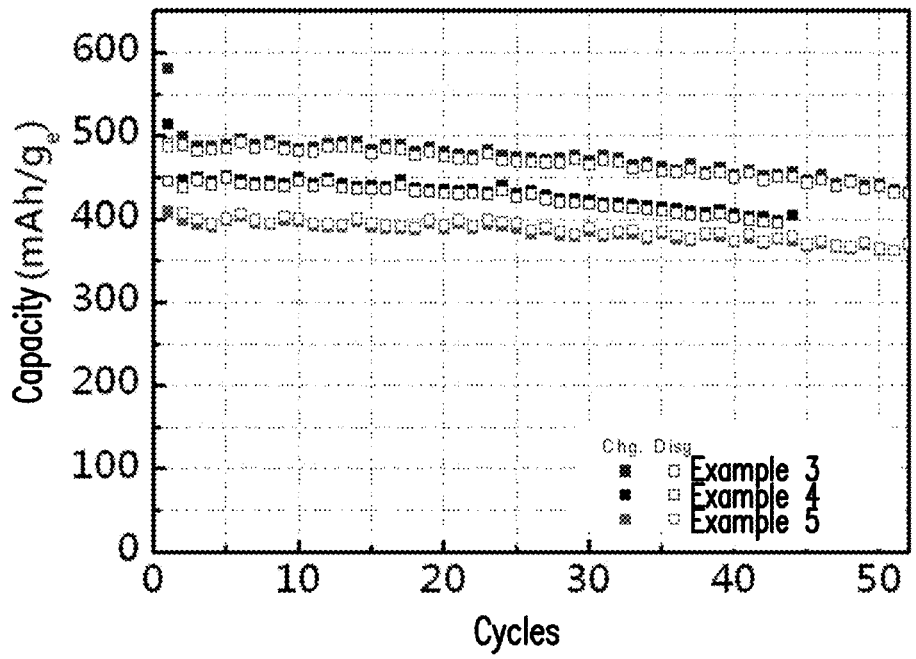
FIG. 13 is a graph showing the cycle charge/discharge efficiency of Examples 3-5.

In Example 3, 33 wt % of an anode active material which is manufactured by the above-mentioned manufacturing process illustrated in FIG. 11 (which has 35 wt % of the soft carbon) and 54 wt % of soft carbon (purchased from CPC Corporation, Taiwan) were provided, and 5 wt % superconductive carbon black (super p) and 8 wt % binder (purchased from Scientific Polymer Products, Inc., model no. PAA-Na) were further added to form a lithium battery anode material of Example 3. Next, the lithium battery anode materials of Examples 1-3 were subjected to charge/discharge at different charge rates. Specifically, the lithium battery anode materials of Examples 1-3 were charged/discharged at a fixed current of 0.1C (C-rate), 0.2C, 0.5C, 1C, 3C, and 5C respectively, and the results are shown in FIG. 12. Then, the lithium battery anode material of Example 3 was subjected to cycle charge/discharge, and the results are shown in FIG. 13.

FIG. 12 is a graph showing the cycle charge/discharge efficiency of Examples 1-3 at different charge rates.

Referring to FIG. 12, the lithium battery anode material of Example 3 has a higher capacitance value than the lithium battery anode materials of Examples 1-2 in the case of rapid charging (i.e., at a charging current of 5C). That is to say, adding the soft carbon into the lithium battery anode material is able to promote the effect of rapid charging.

Example 4

In Example 4, 27 wt % of an anode active material which is manufactured by the above-mentioned manufacturing process illustrated in FIG. 11 (which has 35 wt % of the soft carbon) and 60 wt % of soft carbon (purchased from CPC Corporation, Taiwan) were provided, and 5 wt % superconductive carbon black (super p) and 8 wt % binder (purchased from Scientific Polymer Products, Inc., model no. PAA-Na) were further added to form a lithium battery anode material of Example 4. Next, the lithium battery anode material of Example 4 was subjected to cycle charge/discharge, and the result is shown in FIG. 13.

Example 5

In Example 5, 22 wt % of an anode active material which is manufactured by the above-mentioned manufacturing process illustrated in FIG. 11 (which has 35 wt % of the soft carbon) and 65 wt % of soft carbon (purchased from CPC Corporation, Taiwan) were provided, and 5 wt % superconductive carbon black (super p) and 8 wt % binder (purchased from Scientific Polymer Products, Inc., model no. PAA-Na) were further added to form a lithium battery anode material of Example 5. Next, the lithium battery anode material of Example 5 was subjected to cycle charge/discharge, and the result is shown in FIG. 13.

FIG. 13 is a graph showing the cycle charge/discharge efficiency of Examples 3-5.

Referring to FIG. 13, after 50 charge/discharge cycles, the capacitance values of the anode materials of Examples 3-5 are maintained at a certain level (i.e., >85%). That is to say, the anode material having soft carbon retains a good charge/discharge retention rate after a plurality of charge/discharge cycles.

Figure 14:
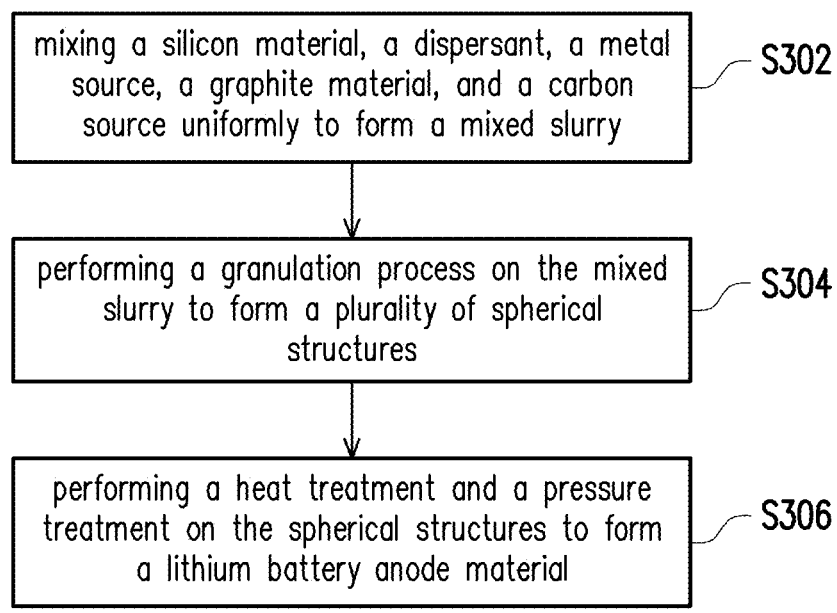
FIG. 14 is a schematic view showing the manufacturing process of a lithium battery anode material in accordance with a third embodiment of the present invention.

FIG. 14 is a schematic view showing the manufacturing process of a lithium battery anode material in accordance with a third embodiment of the present invention.

Referring to FIG. 14, a third embodiment of the present invention provides a method of manufacturing a lithium battery anode material including following steps. First, in step S302, a silicon material, a dispersant, a metal source, a graphite material, and a carbon source are uniformly mixed to form a mixed slurry. Basically, step S302 is similar to step S102, the difference therebetween lies that the average particle diameter of the silicon material in step S302 may be between 50 nm and 450 nm, and the dispersant (e.g., PEG (poly ethylene glycol), Triton-X, SDS (Sodium dodecyl sulfate), DTAB (dodecyl trimethyl ammonium bromide), PVP (polyvinylpyrrolidone), SDBS (dodecylbenzenesulfonate), Brij 35, etc.) is used to disperse the nano-scale silicon material to avoid agglomeration. Other similarities are not repeated here.

Next, step S304 is performed. Basically, step S304 is similar to step S104, that is, a granulation process is performed on the mixed slurry to form a plurality of spherical structures.

Thereafter, in step S306, a heat treatment and a pressure treatment (which controls the pressure in the furnace to be a positive pressure) are performed on the plurality of spherical structures to form a lithium battery anode material. Basically, step S306 is similar to step S106, the difference therebetween lies that the furnace pressure in step S306 is higher than the furnace pressure in step S106 (which is atmospheric pressure, about 1013 mbar). In an embodiment, the pressure treatment may have a pressure range of about 100 to 1000 mbar greater than a (standard) atmospheric pressure. In addition, it should be mentioned that the metal silicide formed by the first heat treatment may be used as a catalyst for the growth of the subsequent carbon fibers, in addition to improve the conductivity of the lithium battery anode material. In detail, in the carbon source environment produced by the thermal decomposition of the above carbon source and dispersant, the heat treatment can further promote the formation of carbon fibers by adjusting the catalyst, furnace atmosphere pressure, and processing time, other than the formation of silicon carbide crystals (e.g., the crystals 312 and/or the crystals 314), and/or the agglomerate 320 and/or the protrusions 330 on the surface of the agglomerate 320. In addition, it is able to control the ratios between the carbon fibers, the silicon carbide crystals, the agglomerate, and the protrusions by adjusting the conditions of the heat treatment and the pressure treatment. It should be mentioned that the carbon fibers of the present embodiment can further serve as a conductive network when the anode material is pulverized or cracked due to the volume expansion.

Figure 15:
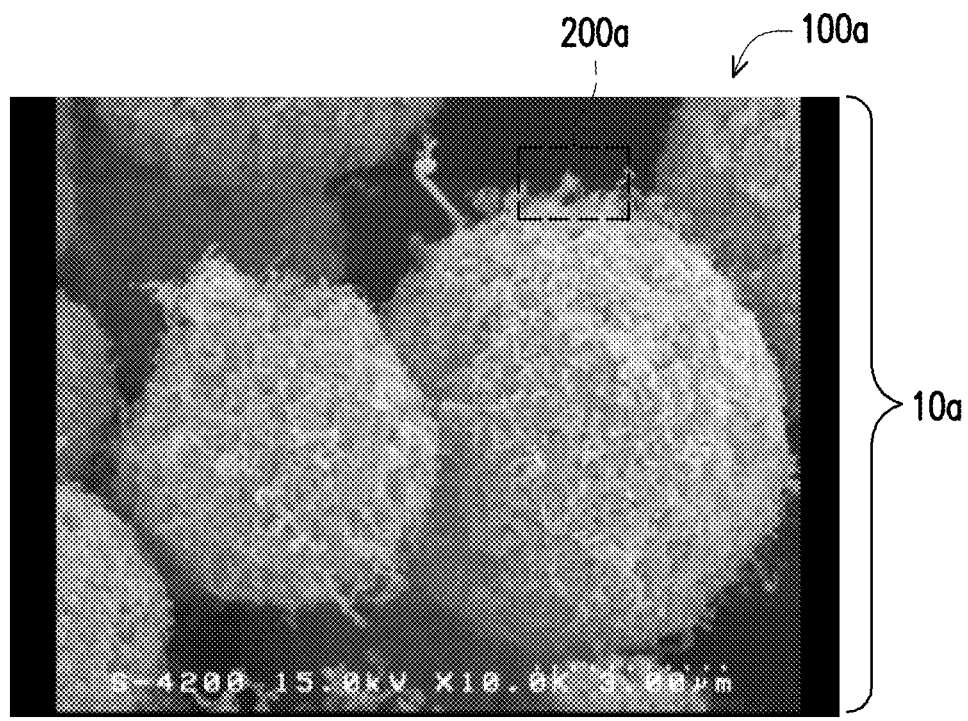
FIG. 15 is an electron micrograph of the lithium battery anode material in accordance with the third embodiment of the present invention.
Figure 16:
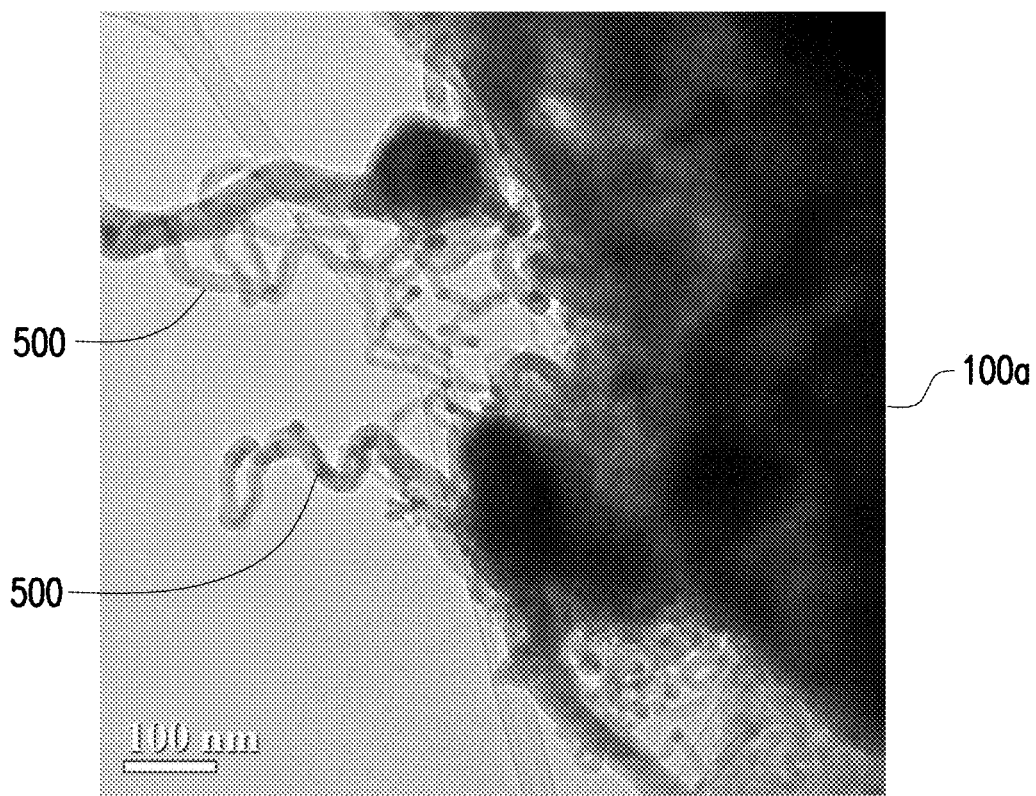
FIGS. 16 through 17 are transmission electron microscope (TEM) images of a surface of a portion of the lithium battery anode material of FIG. 15.
Figure 17:
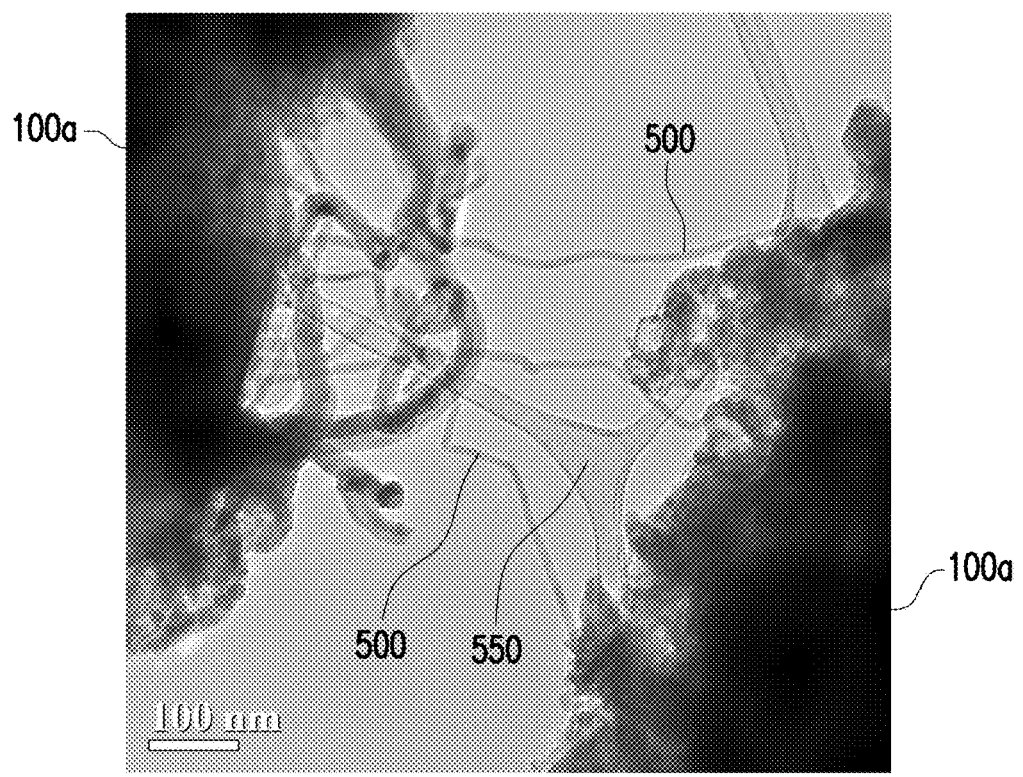
Figure 18:
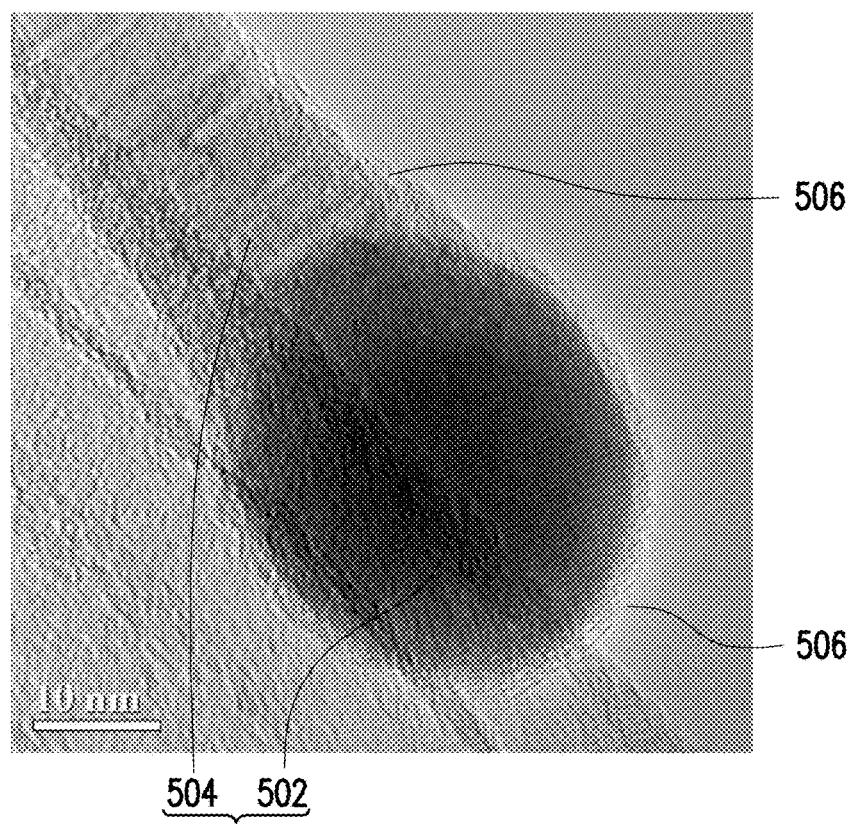
FIG. 18 is an enlarged TEM image of the carbon fibers of FIG. 17.

FIG. 15 is an electron micrograph of the lithium battery anode material in accordance with the third embodiment of the present invention. FIGS. 16 through 17 are transmission electron microscope (TEM) images of a surface of a portion of the lithium battery anode material of FIG. 15. FIG. 18 is an enlarged TEM image of the carbon fibers of FIG. 17.

Referring to FIG. 15, a lithium battery anode material 10a manufactured by the manufacturing process of the lithium battery anode material illustrated in FIG. 14 includes a plurality of spherical structures 100a. A portion 200a of the lithium battery anode material 10a includes a graphite material and a composite material (which may be schematically shown in FIG. 3A). As seen in FIGS. 16-17, the portion 200a of the lithium battery anode material 10a includes a plurality of carbon fibers 500. It should be noted that the carbon fibers 500 between adjacent spherical structures 100a is able to be in contact with each other to form a conductive network 550. Specifically, the carbon fibers may be grown on the surface of the silicon material by catalytic of the metal source and processing treatments. In an embodiment, the carbon fibers 500 may have a length between 50 nm and 2000 nm. Specifically, as shown in enlarged view of FIG. 18, the carbon fiber 500 including a head portion 502 and a body portion 504, the head portion 502 is formed by the enlargement of a free end of the carbon fiber 500. In an embodiment, the head portion 502 includes at least one of the group consisting of silicon, metal, and metal silicide. In this embodiment, the head portion 502 may be made of metal silicide (such as, but not limited to, nickel silicide). The body portion 504 may be made of a carbon material. In an embodiment, the body portion 504 may be made of a pure carbon material. Additionally, the head portion 502 is covered and protected by an amorphous carbon material 506. Further, in addition to the head portion 502, the body portion 504 and a root portion (not shown) of the carbon fiber 500 are also covered and protected by the carbon material 506.

In alternative embodiments, the composite material of the lithium battery anode material manufactured by the manufacturing process of the lithium battery anode material illustrated in FIG. 14 may also include a silicon material, an agglomerate, and a plurality of protrusions, wherein the surface of the silicon material is simultaneously grown with a plurality of crystals and a plurality of carbon fibers. The silicon material, the crystals made of silicon carbide, the agglomerate, and the plurality of protrusions are similar to the silicon material, the crystals, the agglomerate, and plurality of protrusions of the first embodiment, and are not described herein. However, the present invention is not limited thereto, in other embodiments, the composite material of the lithium battery anode material may only include the silicon material and the agglomerate, and has no protrusions, wherein the surface of the silicon material is simultaneously grown with a plurality of crystals and a plurality of carbon fibers.

Example 6

In Example 6, 75 wt % of an anode active material which is added with metal source (i.e., the anode active material manufactured by the above-mentioned manufacturing process illustrated in FIG. 1 with a Ni content of 10%) was provided, and 15 wt % superconductive carbon black (super p) and 10 wt % binder (purchased from Scientific Polymer Products, Inc., model no. PAA-Na) were further added to form a lithium battery anode material of Example 6. Next, the lithium battery anode material of Example 6 was subjected to charge-discharge curve measurement experiment, and the result is shown in FIG. 19.

Example 7

In Example 7, 75 wt % of an anode active material which is added with metal source (i.e., the lithium battery anode material manufactured by the above-mentioned manufacturing process illustrated in FIG. 14 with a Ni content of 10%) was provided, and 15 wt % superconductive carbon black (super p) and 10 wt % binder (purchased from Scientific Polymer Products, Inc., model no. PAA-Na) were further added to form a lithium battery anode material of Example 7. Next, the lithium battery anode material of Example 7 was subjected to charge-discharge curve measurement experiment, and the result is shown in FIG. 20.

Figure 19:
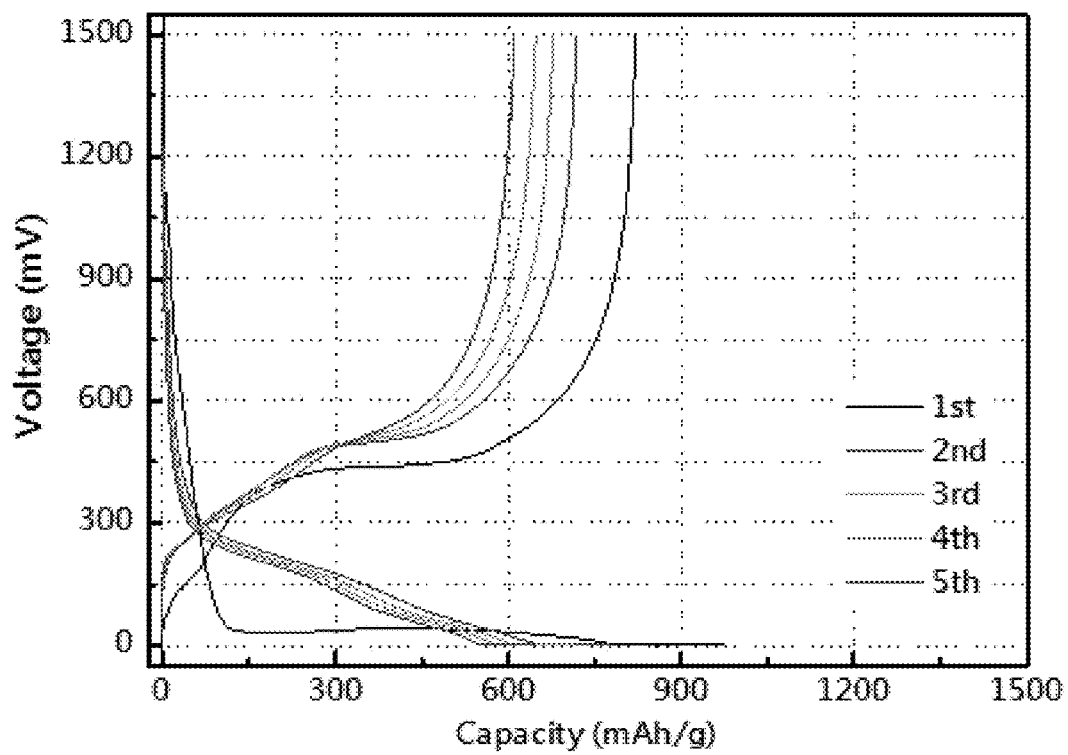
FIG. 19 is a charge/discharge curve graph of Example 6.
Figure 20:
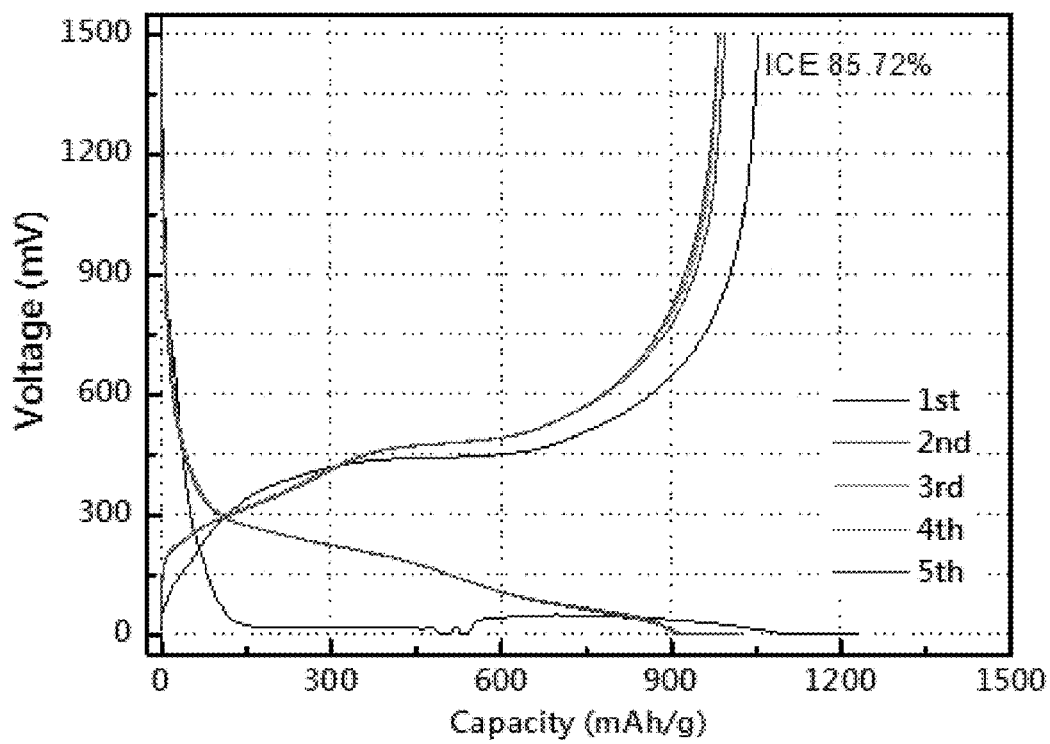
FIG. 20 is a charge/discharge curve graph of Example 7.

From the experimental results of FIG. 19 to FIG. 20, although Examples 6 and 7 have the same content of the lithium battery anode material which is added with metal source (i.e., 75 wt %), Example 7 has a better stability than Example 6 because Example 7 has a conductive network constituted of a plurality of carbon fibers.

Example 8

In Example 8, the lithium battery anode material of Example 7 was blended with natural graphite to manufacturing an electrode sheet. Next, the button type half-cell having a capacitance of 450 mAh/ge of the lithium battery anode material of Example 8 was subjected to charge-discharge, and the results are shown in FIG. 21 and FIG. 22.

Figure 21:
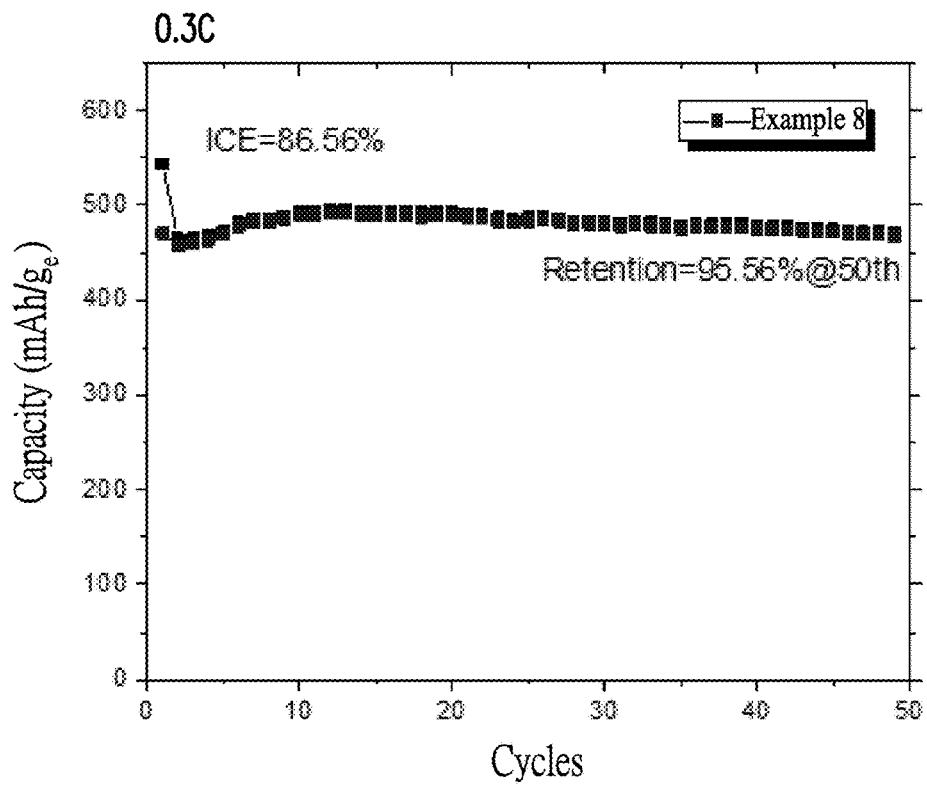
FIG. 21 and FIG. 22 are cycle charge/discharge efficiency diagrams of Example 8 at different charge rates.
Figure 22:
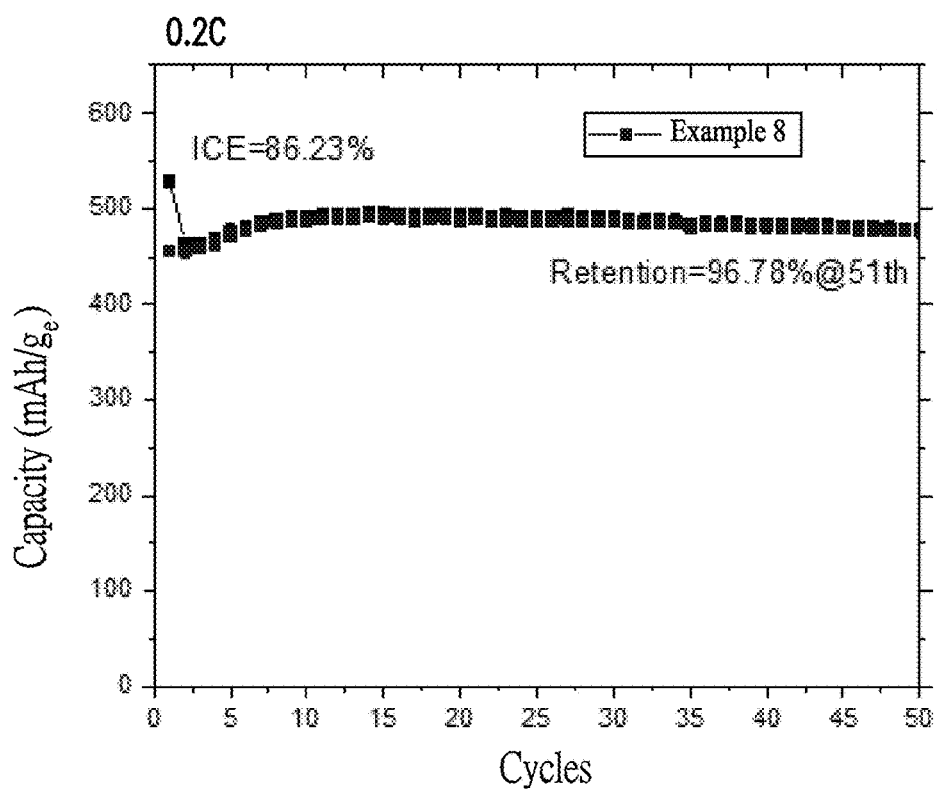

Referring to FIG. 21 and FIG. 22, the button type half-cell having the lithium battery anode material of Example 8 was charged and discharged with a fixed current of 0.2C and 0.3C, and the capacitance value was still maintained at 95% to 96% after 50 charge/discharge cycles. That is, the lithium battery anode material manufactured by the manufacturing process of the third embodiment has a better charge/discharge retention rate than the first embodiment.

In summary, in the present invention, a composite material having a silicon-based material and a graphite material are mixed to form a lithium battery anode material having a plurality of spherical structures. The silicon-based material is able to effectively increase the capacitance of the lithium battery. The silicon carbide in the composite material may buffer the volume expansion of the silicon-based material, thereby solving the problem of decomposition of the anode material due to excessive expansion of the silicon-based material, and further increasing the charge/discharge retention rate and extending the life time of the lithium battery. In addition, the lithium battery anode material of the present invention further includes a soft carbon to achieve a high-speed charge/discharge effect. Moreover, the lithium battery anode material of the present invention has carbon fibers formed on the surface of the silicon material, which further enhances the conductivity, stability, and charge/discharge retention.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A lithium battery anode material, comprising:
a graphite material; and
a composite material mixed with the graphite material to form a plurality of spherical structures, wherein the composite material comprises:
a silicon material, wherein a plurality of crystals are grown on a surface of the silicon material, and the crystals comprises silicon carbide;
an agglomerate comprising metal silicide; and
a plurality of protrusions distributed on a surface of the agglomerate, wherein the protrusions comprise silicon and metal.

2. The lithium battery anode material of claim 1, wherein the graphite material comprises a few-layer graphite.

3. The lithium battery anode material of claim 1, wherein the silicon material comprises a sheet-like silicon, and a thickness of the sheet-like silicon is from 50 nm to 200 nm.

4. The lithium battery anode material of claim 1, wherein each of the crystals comprises a whisker, the whisker comprises a columnar portion and a spherical portion on the columnar portion, and the columnar portion is in contact with the surface of the silicon material.

5. The lithium battery anode material of claim 1, wherein each of the crystals comprises a spherical portion being in contact with the surface of the silicon material.

6. The lithium battery anode material of claim 1, further comprising a soft carbon uniformly distributed in the spherical structures.

7. The lithium battery anode material of claim 1, further comprising a plurality of carbon fibers grown from the surface of the silicon material.

8. The lithium battery anode material of claim 7, wherein a free end of one of the carbon fibers is formed with a head portion, the head portion comprises at least one of the group consisting of silicon, metal, and metal silicide.

9. A method of manufacturing a lithium battery anode material, comprising:
mixing a silicon material, a metal source, a graphite material, and a carbon source uniformly to form a mixed slurry;
performing a granulation process on the mixed slurry to form a plurality of spherical structures; and
performing a heat treatment on the spherical structures to form a lithium battery anode material.

10. The method of claim 9, wherein a content of the silicon material is from 3 wt % to 80 wt %, based on the weight of the mixed slurry.

11. The method of claim 9, wherein a content of the metal source is from 3 wt % to 30 wt %, based on the weight of the mixed slurry.

12. The method of claim 9, wherein a content of the graphite material is from 5 wt % to 30 wt %, based on the weight of the mixed slurry.

13. The method of claim 9, wherein the graphite material comprises a few-layer graphite, and a method of forming the few-layer graphite comprises passing a graphite bulk through a high pressure passage.

14. The method of claim 9, wherein a content of the carbon source is from 3 wt % to 20 wt %, based on the weight of the mixed slurry.

15. The method of claim 9, wherein the heat treatment comprises a first heat treatment and a second heat treatment, and a processing temperature of the first heat treatment is less than a processing temperature of the second heat treatment.

16. The method of claim 15, wherein a processing time of the first heat treatment is less than or equal to a processing time of the second heat treatment.

17. The method of claim 9, further comprising adding a soft carbon in the mixed slurry during performing the granulation process on the mixed slurry.

18. The method of claim 17, wherein a content of the soft carbon is from 20 wt % to 60 wt %, based on the weight of the mixed slurry.

19. The method of claim 9, wherein a step of forming the mixed slurry further comprises mixing a dispersant uniformly with the silicon material, the metal source, the graphite material, and the carbon source.

20. The method of claim 9, wherein the performing the heat treatment on the spherical structures further comprises performing a pressure treatment.

* * * * *